Sept. 19, 1972   W. H. STREHLOW   3,692,572
EPITAXIAL FILM PROCESS AND PRODUCTS THEREOF
Filed Aug. 12, 1969   3 Sheets-Sheet 2

INVENTOR.
WOLFGANG H. STREHLOW
BY Kinney, Alexander,
Sell, Steldt & DeLaHunt
ATTORNEYS 3,692,572
EPITAXIAL FILM PROCESS AND
PRODUCTS THEREOF
Wolfgang Strehlow, 3M Center, St. Paul, Minn. 55101
Int. Cl. B44c 1/02, 1/18; H01s 3/08
U.S. Cl. 117—201                                17 Claims

ABSTRACT OF THE DISCLOSURE

A process for producing epitaxial films comprising reacting a crystalline source material with a gaseous reagent at a first temperature to form vapor phase reaction products and exposing a substrate to the reaction products at a second lower temperature to grow an epitaxial film on the substrate. And, the process further comprising reflective coating at least one film surface and one other surface of either the film, substrate, or an attached support to form a resonant cavity. Products according to the process described.

BACKGROUND OF THE INVENTION

This invention relates generally to solid state laser materials and to processes for their production. More particularly, the invention relates to laser materials which, in response to a beam of exciting energy, produce a beam of electromagnetic radiation which is concentric with respect to the exciting beam.

Such laser materials have two major surfaces which are plano-parallel. The major surfaces form the reflective-faces of a light resonant cavity, frequently referred to as Fabry-Perot cavity. When a beam of exciting energy of sufficient intensity is substantially normal to and incident upon at least one major surface of a properly selected material, a beam of electromagnetic radiation emerges from the other major surface. The beam emerges normal to the surface and at a point opposite that at which the exciting beam is incident. That is, in such materials the exciting beam and resulting beam of electromagnetic radiation are coaxial. "Scanning" of the electromagnetic radiation produced from such materials may thus be easily accomplished by simply moving the point at which the exciting energy is incident.

Many laser applications to be successful commercially require scanning capability, e.g. recording applications in which the laser beam must be directed to each discrete location in an $x$-$y$ coordinate grid pattern or "TV" type applications in which the beam must be scanned across a plurality of horizontal lines.

An example of such a prior art laser material which provides scanning capability is a naturally grown single crystal platelet the major surfaces of which are substantially plano-parallel. Cadmium sulfide selenide platelets have been made to produce emission coaxial with respect to a beam of exciting energy. End Pumped Laser Emission from Cadmium Sulfide Selenide Bombarded by an Electron Beam, Journal of Applied Physics, vol. 38, No. 7, 3035–3036, June 1967, by W. C. Tait, J. R. Packard. G. H. Dierseen, and D. A. Campbell. The scanning dimensions, i.e. the boundaries of the platelet major surfaces were reported to be 1 mm. x 5 mm. Larger platelets are obtainable. However, the yield of such larger platelets (up to approximately 3.20 mm. x 6.40 mm.) having major surfaces of sufficient plano-parallelity is very low.

Many commercial applications, however, require that at least one, and preferably both, scanning dimensions be on the order of at least 16 mm. Materials having one or both dimensions of at least 35 mm. would be even more desirable, such materials being particularly useful in microfilm recording applications.

SUMMARY OF THE INVENTION

In one embodiment of the present invention, laser materials having scannable areas in excess of (35 mm.$^2$) are provided in high yields from a chemical vapor deposition process. The laser material is an epitaxial thin film of a compound or solid solution containing at least one of the elements cadmium, zinc, and mercury with at least one of the elements sulfur, selenium, and tellurium on a suitably selected and prepared substrate. The process is a chemical vapor transport process in which a sufficiently pure source material undergoes a reversible chemical reaction with a transport reagent at a first temperature to form exclusively vapor phase reaction products. The reaction is endothermic, thus the substrate temperature is maintained at a second temperature sufficiently lower than the first temperature tha the source material is grown on the substrate in a single crystalline form by the reverse reaction of the reaction products. The process thus produces a high yield of epitaxial thin films of large scannable areas.

Substrate materials which have been found to have suitable characteristics include calcium fluoride, barium fluoride, cadmium fluoride, strontium fluoride, and mixtures thereof. Other suitable substrate materials include cadmium sulfide and other compounds of elements of column II and column VI of the periodic table.

The process of this invention produces epitaxial films possessing two major surfaces of sufficient plano-parallelity to form the reflective-faces of a Fabry-Perot cavity. Alternatively, one surface of the epitaxial film and one surface of the substrate (or one surface of a transparent support) may be employed as the Fabry-Perot cavity reflective-faces. In either case, in order that sufficient amplification occur within the cavity to produce laser emission, the plano-parallel surfaces may be coated with a light reflective material.

If it is desired that the epitaxial film surfaces form the cavity, the exposed film surface may first be coated with a light reflective material after which a support can be attached to the newly coated surface. Next the substrate may be separated from the film leaving the film attached to the support. By coating the newly exposed film surface, the two film surfaces form the reflective-faces of a Fabry-Perot cavity.

Where one of the film surfaces and one of the substrate surfaces are to form the cavity reflective-faces, it is only necessary to coat both of the exposed film and substrate surfaces. The substrate exposed surface must, of course, have first been cleaved or otherwise made to be plano-parallel to the exposed film surface.

The source material may be either polycrystalline or single crystalline; usually, the source will be polycrystalline because of the greater availability of polycrystalline materials. The source material is selected to have a surface area at least equal to the area of the film to be grown. The source material surface which is to be opposite the substrate surface upon which the film will be grown should be substantially flat. (The opposing source and substrate surfaces are to be aligned substantially plano-parallel during the deposition process.) The source material should contain less than ten parts per million of impurities.

The substrate should be selected to be substantially transparent to the electromagnetic radiation to be produced by the epitaxial material. The substrate should also be selected to be thermally stable at the process deposition temperature. Further, it is well known in the art of growing epitaxial films that the interatomic spacing of the substrate and the film material interfacial lattice spacings should be as nearly equal as possible. By interfacial spacings it is meant the interatomic spacings of the major substrate surface upon which the film is to be deposited and the interatomic spacing of the film material crystalline face which will be in contact with the substrate surface. The substrate is selected to have an area slightly greater than the area of the film to be grown. To insure that the exposed film surface is planar, the substrate surface upon which the film is to be deposited should also be planar. For those applications in which it is desired to reflective coat both sides of the epitaxial film material, it is desirable that the substrate have a solubility much greater than that of the film material.

Cleaved crystal surfaces are particularly suitable for substrate surfaces since such surfaces are atomically flat over areas between cleavage steps. An example of a crystal surface suitable as a substrate surface would be the (111) cleavage plane of single crystalline alkaline earth fluorides. The 111 plane of such materials may be obtained by, e.g., simply cleaving a piece of the material with a sharp, relatively thin, instrument such as a chisel. Other methods of obtaining the (111) plane are acceptable; however, cleaving offers the advantage that the exposed surface is inherently atomically flat between cleavage steps and thus (for applications in which a substrate surface is to form one of the reflective-faces) two such cleaved surfaces provide plano-parallel surfaces. Also, it is possible to cleave a crystal so as not to form a destruction layer. Destruction layers are known to be detrimental to the growth of epitaxial films.

It is also possible to prepare suitable substrates from bulk materials by other processes termed in the vernacular as "mechanical" and "chemical." Examples of suitable processes of these types are set forth in co-pending applications Ser. No. 745,437, filed July 17, 1968, now abandoned, and Ser. No. 745,618, filed July 17, 1968, now abandoned and continued as divisional application Ser. No. 98,097 filed Dec. 11, 1970, which applications are assigned to the assignee of the present invention. Although the processes described in applications Ser. No. 745,437 and Ser. No. 745,618 are specifically directed toward preparation of a laser crystal, it has been found that the processes are also acceptable for preparing a material for use as a substrate.

According to the process of this invention large-area epitaxial films are grown by a chemical vapor deposition process aided by an inert carrier gas.

The process comprises reacting a solid source material, A(s), with a gaseous transport reagent, B(g), to form exclusively vapor phase reaction products, $C(g)_n$, according to the following equation:

$$A(s) + B(g) \rightleftharpoons C(g)_n + \cdots$$

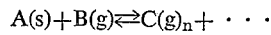

wherein it is shown that the process is reversible. The enthalpy of formation of reaction products $C(g)_n$ is smaller than the enthalpy of evaporation of source material A(s) and the formation of reaction products $C(g)_n$ is endothermic. Reaction products $C(g)_n$ are carried to a substrate maintained at a temperature sufficiently lower than the source material temperature that a single crystalline film of the source material is deposited on the substrate. An inert carrier gas such as argon is added to the transport reagent whenever the vapor pressure of the transport reagent at ambient temperature is less than atmospheric pressure. Both the carrier gas and transport reagent are purified prior to introduction into the reaction vessel by well-known chemical or physical methods. For example, if hydrogen is used as the reagent, it may be purified by passing it through a liquid nitrogen cold trap; argon may be purified by bringing it in contact with a secondary supply of the source material so that if impurities are present in the argon they will react with the secondary source material.

The process is carried out within a reaction vessel wherein a source material and a substrate are maintained in plano-parallel relation. The substrate and source planar surfaces are arranged to be substantially plano-parallel; separations of the source and substrate of 4mm. and somewhat less have been found acceptable. Means are provided for independently heating the substrate and source materials. During reaction, the source or reaction temperature is maintained at a first temperature within the range of from 400° C. to 1000° C., and preferably within the range of 550° C. to 750° C. The substrate or deposition temperature is maintained at a second lower temperature. The second temperature is sufficiently lower than the source temperature that the reaction product C(g) arriving at the substrate will form an epitaxial layer of the source material A(s). Generally, a temperature gradient of from 5 to 100° C. will be suitable. Initially, the source and substrate materials are raised to a common temperature near the source material reaction temperature, and the reaction vessel is flushed with a purified inert gas, such as argon. After flushing the vessel, the source and substrate material are vacuum etched to remove volatile surface impurities. A vacuum of about $10^{-2}$ torr applied for about 10 minutes has been found successful for carrying out the vacuum etch step. After the vacuum etch, the source and substrate material are set to their respective reaction and deposition temperatures and the transport reagent, or the transport reagent and an inert carrier gas as the case may be, are introduced into the reaction vessel. The reaction then proceeds until a sufficiently thick film is deposited on the substrate. A flow rate of from 1 to 15 cu. centimeters per minute of the transport reagent or of a mixture of the transport reagent and a carrier gas has been found acceptable in a reaction vessel having a cross section of about 30 cm.$^2$.

Having thus described the general considerations relevant to making the present invention, specific examples of preferred embodiments will now be described with reference of the accompanying drawing wherein:

Figure 1:
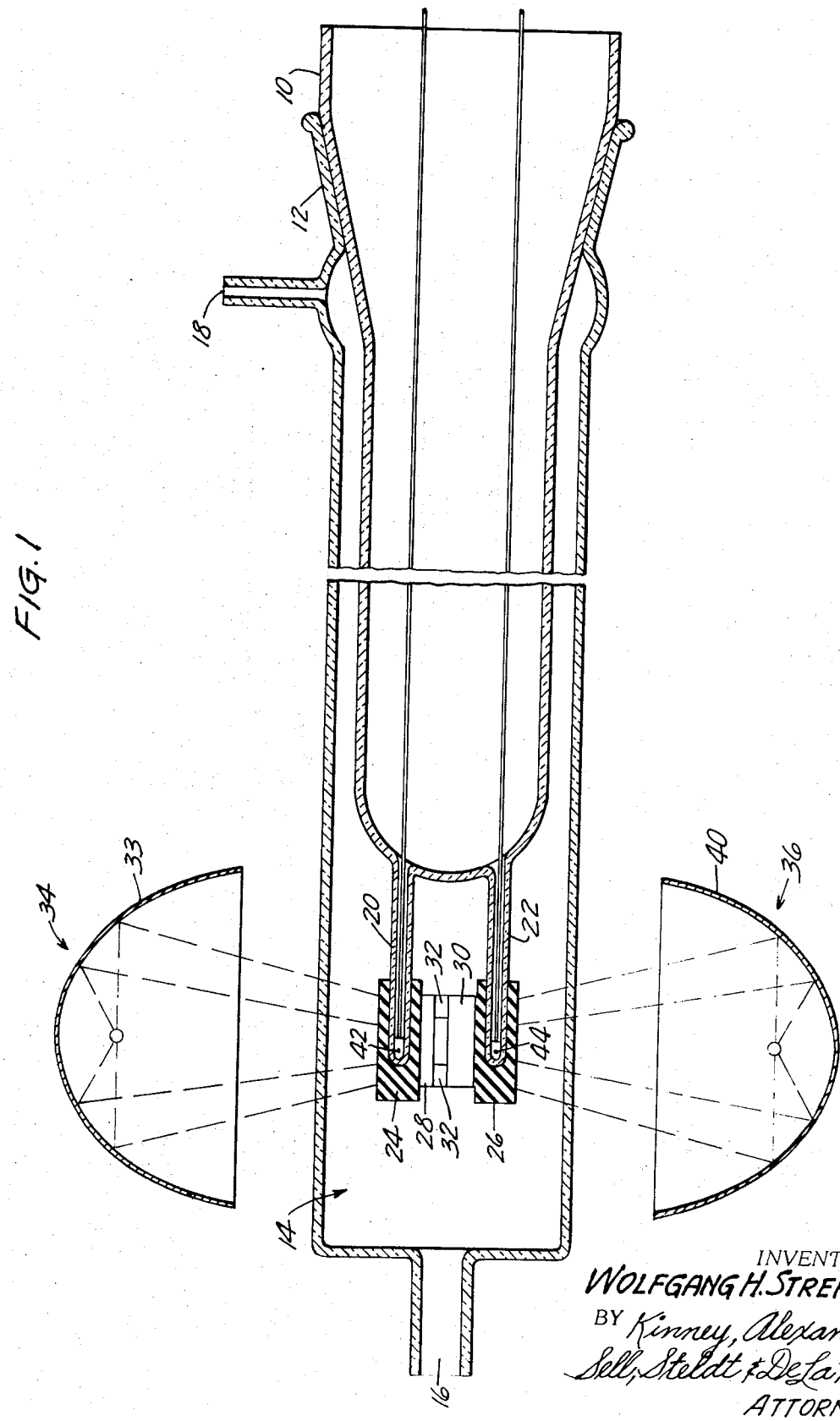
FIG. 1 is a cross section of apparatus suitable for carrying out the chemical vapor deposition process of the present invention.

With reference to FIG. 1, an inner member 10 and an outer member 12 have mating tapered surfaces which provide a reaction chamber shown generally as 14. As will later become apparent, members 10 and 12 should be formed from some material, such as quartz, which because of its low resistance will readily permit heating of apparatus within the chamber by an external heat source. Outer member 12 is provided with an inlet 16 and outlet 18 for passage therethrough of a transport reagent or of a mixture of a transport reagent and a carrier gas. Extensions 20 and 22 of inner member 10 carry heat transfer blocks 24 and 26 respectively of a material such as graphite. A substrate material 28 is shown on block 24 separated from a source material 30 on block 26 by heat insulating spacers 32. (The relative position of the source and substrate material may be reversed, although it is preferred to have the substrate above the source in order to preclude solid particles of the source material from falling onto the substrate.) Independently controlled heat sources 34 and 36, such as infrared lamps, shown mounted external to the reaction vessel are focused on heat-transfer blocks 24 and 26 respectively by elliptical electrical reflectors 38 and 40. Thermocouples 42 and 44 sense the temperatures of heat transfer blocks 24 and 26 respectively to facilitate controlling of the source and substrate temperatures.

The advantages of the invention will become more apparent after a consideration of the following examples.

EXAMPLE 1

This example is concerned with epitaxial growth of cadmium sulfide on a substrate of strontium fluoride.

A polycrystalline source of cadmium sulfide, pure to within 10 parts per million, having dimensions of approximately 35 by 35 by 3 mm., and having one surface prepared flat to within 0.051 mm. was used.

The substrate was a single crystalline specimen of strontium fluoride having dimensions of approximately 40 by 40 by 2 mm. Both substrate major surfaces were prepared by cleaving the material along (111) planes. The interfacial misfit between the interatomic spacing of the film and substrate lattices, at reaction temperature, was calculated to be a negligible 0.2%.

The process was carried out as previously described using hydrogen as the transport reagent. A carrier gas was not used. The flow rate was approximately 5 cu. cm./min., the source or first temperature was 700° C. and the substrate or second temperature was 600° C. The source and substrate separation was 2 mm. The reaction was allowed to continue for 180 minutes and produced a film of approximately 9.4 $\mu$m. thickness.

The plano-parallel major surfaces of the film-substrate structure were then reflectorized. A coating of silver about 650 A. thick was applied, in a well-known manner, to the exposed major surface of the CdS film. A dielectric mirror comprised of alternate layers of ZnS and cryolite, there being four layers of ZnS and three layers of cryolite, was deposited on a glass substrate. The mirror was fabricated in a well-known manner similar to that described in the text of the December 1954 edition of the Optical Properties of Solid Films, authored by O. S. Heavens and published by Dover. See page 220 of the text, in particular. The exposed ZnS layer of the dielectric structure was then adhered to the exposed major surface of the SrF$_2$ substrate with Eastman 910 adhesive.

The reflectorized film-substrate structure was then mounted in the optical access tail section of a standard helium cryostat and the silvered surface pumped or bombarded with a beam of electrons from an electron gun. Reference may be had to co-pending application serial No. 588,906, filed Oct. 24, 1966, now abandoned and continued as Ser. No. 124,949 filed Mar. 16, 1971, assigned to the same assignee as the present invention, for further details concerning the cryostat, gun, and such other matters as mounting of the film-substrate structure within the cryostat. A difference between the mounting of the material of the present example and that of the illustrative examples of application Ser. No. 124,949, however, was that the present structure was mounted directly over the aperture in the copper mounting tab without having been first mounted to a sapphire substrate. Another difference was that a droplet of silver paint was applied connecting the silver coating and the copper tab so that, in the event the film became charged when bombarded by an electron beam, an electrically continuous path for dissipating the charge would exist between the film and tab.

When an electron beam pulsed at 60 pulses per second, the pulses having a pulse width of about 0.1 $\mu$sec. and the beam having a potential of 45 kev., current density of about 10.0 amps/cm.$^2$, and a cross-sectional area of roughly 10$^{-3}$ cm.$^2$ was impinged upon the silverized surface, an emission spectra waveform of the electromagnetic emission emitted through the dielectric mirror was recorded using a standard grating spectrometer in a well-known manner. The peak power output was 20 milliwatts.

Figure 2:
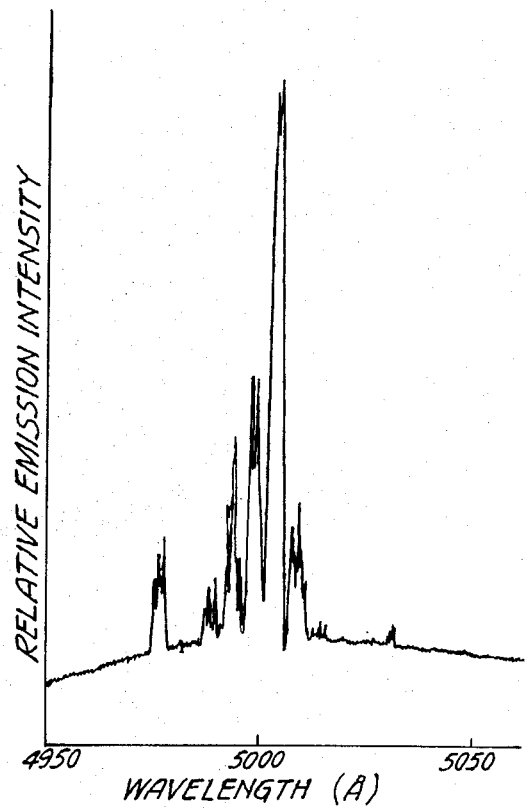
FIG. 2 is a graph showing an emission spectra of the electromagnetic radiation emitted from a film of CdS grown on a cleaved SrF$_2$ substrate in response to pumping the film with a beam of electrons.

FIG. 2 is a reproduction of the spectra waveform taken at 77 degrees K. wherein relative intensity is plotted along the ordinate and wavelength is plotted in angstroms along the abscissa. As shown, the emission peaked at about 5000 A. The emission was observed to rather sharply increase in intensity and to become directional at a current density of about 10.0 amps/cm.$^2$, such directional emission being emitted as a cone having a half angle of about 4°.

EXAMPLE 2

This example is concerned with epitaxial growth of a film of cadmium selenide on a substrate of cadmium sulfide.

A polycrystalline source of cadmium selenide, pure to within ten parts per million, having dimensions of approxmately 16 by 16 by 3 mm., and having both major surfaces prepared flat to within 0.015 mm. was used.

The substrate was a single crystalline specimen of cadmium slufide having dimensions of approximately 20 by 20 by 0.2 mm. The substrate surfaces were prepared by slicing bulk crystals perpendicular to the crystal c-axis. The slices, having a thickness of approximately 0.2 mm., were mechanically polished so that the major faces were planar and parallel to each other. Thereafter, to remove the destruction layer, the (0001) cadmium face was chemically polished with a HCl solution, according to a process as described in the article Chemical Polishing of Cadmium Sulfide, Journal of Electrochem. Soc., 114, 295 (1967), by M. V. Sullivan and W. R. Bracht. The calculated interfacial misfit between the interatomic spacing of the film and the substrate material at their interface for the aforementioned range of reaction temperatures is about 4%.

The process was carried out as previously described using iodine as the transport reagent and argon as an inert carrier gas. The flow rate was approximately 5 cu. cm./min., the source or first temperature was 690° C., and the substrate or second temperature was 660° C. The source and substrate were separated 2 mm. The reaction was allowed to continue for 180 minutes and produced a film with a thicknes sof approximately 9 $\mu$m. The thickness of the films was determined with an optical microscope from cleaved cross sections.

The orientation of the CdSe films, determined by a standard electron diffraction method and through ion blocking studies, was shown to be the same as the CdS substrates.

The film-substrate structure was then separated into two specimens, hereafter "first" and "second" specimens. The exposed major surfaces of the first specimen were reflectorized by coating them in a well-known manner with silver. The CdSe film surface was coated to a reflectivity of about 90% (a coating thickness of about 1550 A.) and the CdS substrate surface was coated to about 85% reflectivity (a coating thickness of about 525 A.).

Figure 3:
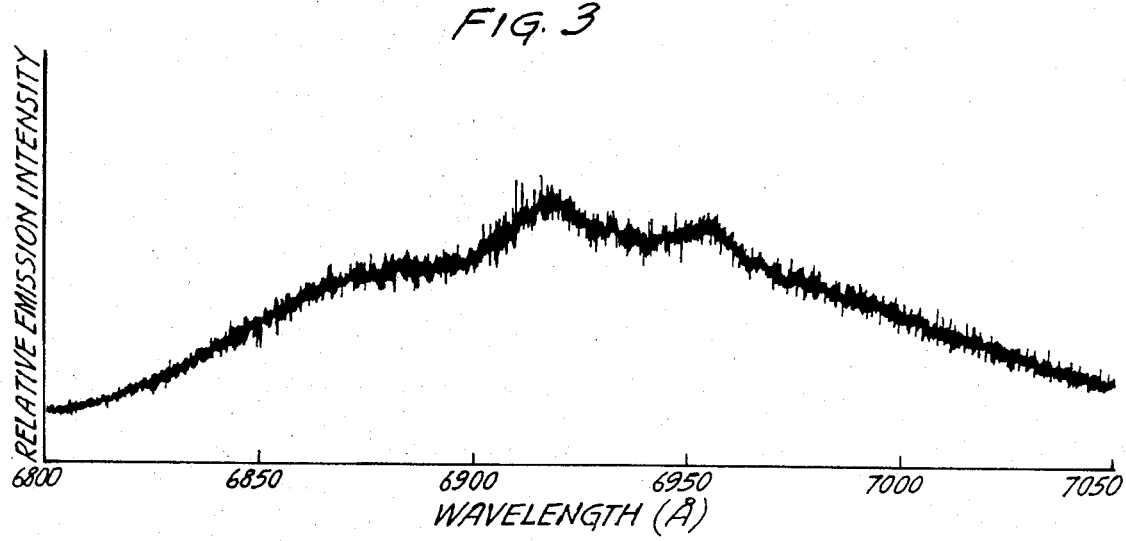
FIGS. 3 and 4 are graphs showing emission spectra of the electromagnetic radiation emitted from a CdSe film grown on a chemically polished substrate.
Figure 4:
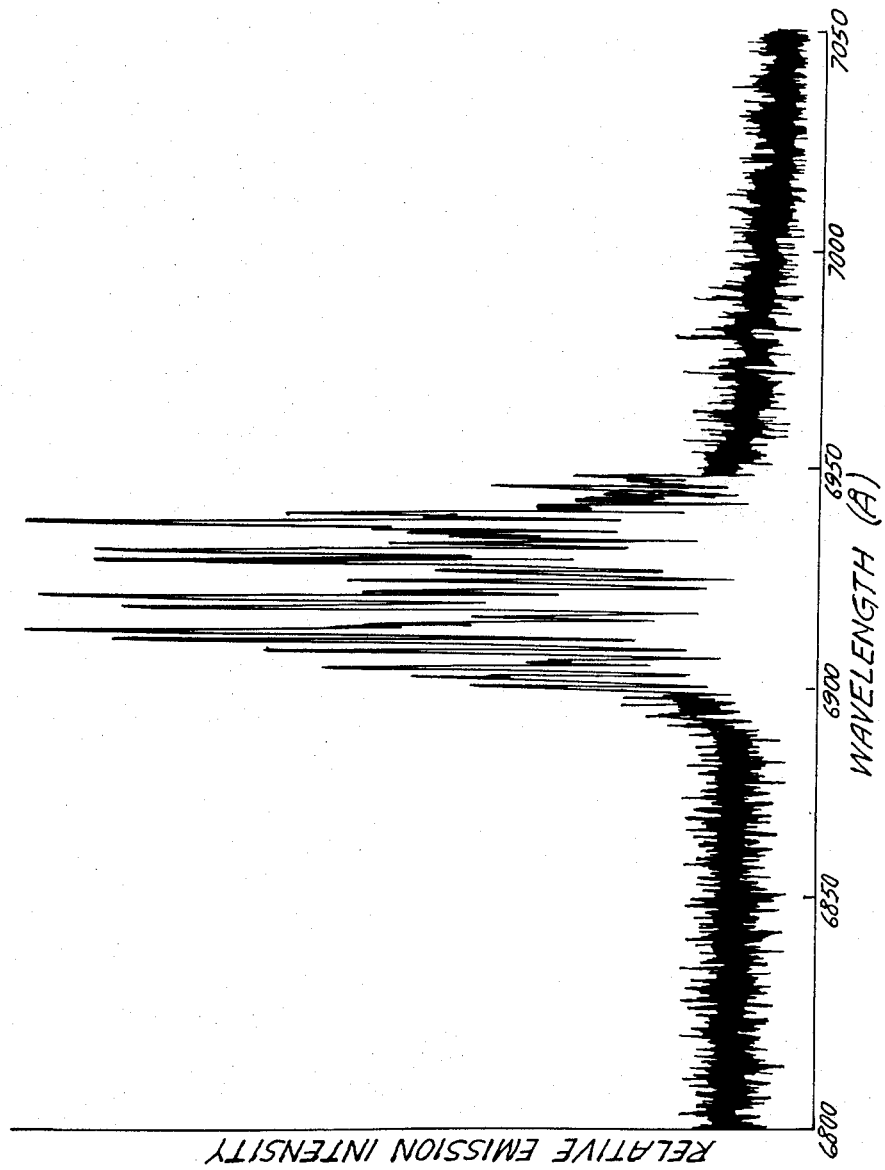

When the first specimen was mounted in the same manner and bombarded in the same manner, using the same cryostat and gun apparatus as described in Example 1, an emission spectra reproduced herein as FIG. 3 was recorded for a current density just below 10.0 amps/cm.$^2$. When the current density was increased to just above 10.0 amps/cm.$^2$, a spectrum reproduced herein as FIG. 4 was recorded. The spectrum of FIG. 4 shows pronounced modes. A peak power output of 50 milliwatts was obtained and directional emission was observed to be emitted as a cone having a half angle of about 6°. At one spot on the film, the onset of laser emission was observed to occur at a current density of about 5.5 amps/cm.$^2$ at 77° K. In FIGS. 3 and 4 relative intensity is plotted along the ordinate and wavelength is plotted in angstroms along the abscissa.

The second specimen was reflectorized by coating the CdSe film with about 1550 A. of silver and applying a dielectric mirror of the type described in Example 1 to the CdS substrate exposed surface. With the specimen cooled to 77° K., when the silvered surface was bombarded as previously described with an electron beam of 45 kev., onset of laser emission occurred at a current density of about 2.5 amps/cm.$^2$. A peak power of 500 milliwatts was obtained. When the structure temperature was increased to room temperature, onset of laser emission did not occur until a current density of about 9 amps per square centimeter was reached and the peak power output dropped to about 50 milliwatts.

While there has been described what are at present considered to be the preferred processes and embodiments of this invention, it will be obvious to those skilled in the art that various changes and modifications may be made therein without departing from the invention. In particular, films of the type grown by the process of the present invention have utilities other than as laser crystals. For example, they may be employed as piezoelectric transducers, ultrasonic delay lines, or photocells. The appended claims, therefore, are intended to cover all such changes and modifications as follows in the true spirit and scope of the invention.

What is claimed is:

1. A process for the production of a Fabry-Perot cavity comprising the steps of:
   (1) reacting with a gaseous reagent at a first temperature within the range from 400° to 1000° C. a crystalline source material comprising a compound or a solid solution containing at least one of the elements cadmium, zinc, and mercury and at least one of the elements sulfur, selenium, and tellurium to form exclusively vapor phase reaction products; and
   (2) subjecting the resulting reaction products to a region of a second and lower temperature adjacent a substrate major surface spaced substantially plano-parallel to and substantially 4 mm. or less from said source material to deposit a single crystal form of said source material on said substrate, said substrate being selected to have an interatomic lattice spacing in the plane of said major surface nearly equal to the interatomic lattice spacing of the crystalline face of the deposited material which will be in contact with said major surface.

2. The process of claim 1 wherein the substrate material and source material each have a substantially flat surface and wherein said substantially flat surfaces are arranged in a substantially plano-parallel orientation.

3. The process of claim 2 wherein the substrate material is selected from the class consisting of calcium fluoride, barium fluoride, cadmium fluoride, and strontium fluoride and mixtures thereof.

4. The process of claim 3 wherein the separation between the substantially flat surfaces is substantially 0.75 mm.

5. The process of claim 3 wherein the source material is cadmium selenide and the substrate material is cadmium sulfide.

6. The process of claim 3 wherein the source material is cadmium sulfide and the substrate materials is strontium fluoride.

7. The process of claim 6 wherein the first temperature is 700° C. and the second temperature is 600° C.

8. The process of claim 6 wherein the carrier gas is hydrogen and wherein the carrier gas is passed through the reaction vessel at a flow rate of 5 cu. cm./min.

9. The process of claim 1 further comprising the steps of:
   (1) coating the exposed film surface to a reflectivity of approximately 90%, and
   (2) bonding the 90% reflectorized surface to a substantially flat surface of a support material, which flat surface area is at least equal to the useable reflectorized surface area and which support material passes without substantial attenuation electromagnetic radiation of the wavelength to be produced by the film;
   (3) separating the substrate from the film,
   (4) coating the newly exposed film surface to a reflectivity of approximately 85%.

10. As an article of manufacture, the product according to the process of claim 1.

11. A process for the production of an epitaxial film comprising the steps of:
    (1) reacting with a gaseous reagent at a first temperature within the range from 400° to 1000° C. a crystalline source material comprising a compound or a solid solution containing at least one of the elements cadmium, zinc and mercury and at least one of the elements sulfur, selenium, and tellurium to form exclusively vapor phase reaction products; and
    (2) subjecting the resulting reaction products to a region of a second and lower temperature adjacent a stronium-fluoride substrate major surface spaced substantially plano-parallel to and substantially 4 mm. or less from said source material to deposit a single crystal form of said source material on said substrate.

12. As a product of manufacture, the product according to the process of claim 11.

13. A process for the production of an epitaxial thin film light resonant Fabry-Perot cavity capable of producing electromagnetic radiation comprising the steps of:
    (A) shaping a crystalline source material comprising a compound or a solid solution containing at least one of the elements cadmium, zinc and mercury and at least one of the elements sulfur, selenium and tellurium, so as to have at least one substantially planar surface;
    (B) preparing a single crystalline substrate material selected to have an interatomic lattice spacing in the plane of said major surface nearly equal to the interatomic lattice spacing of a crystalline face of said source material, so as to have a substantially planar single crystalline destruction layer free surfaces;
    (C) reacting said crystalline source with a gaseous reagent at a first temperature within the range of 400° to 1000° C. to form exclusively vapor phase reaction products; and
    (D) subjecting said substrate destruction layer free surface spaced substantially plano-parallel to and substantially 4 mm. or less from said source material to said vapor phase reaction products at a second and lower temperature to deposit a single crystal form of said source material on said substrate, thereby obtaining an optically active element suitable for producing laser emission upon excitation from an external source.

14. A process according to claim 13 in which said substrate material is a semiconductor selected to be transparent to radiation produced upon excitation of said film from an external source.

15. A process according to claim 13 wherein said substrate major surface is selected to have an interatomic lattice spacing in the plane of said major surface less than about 4% different than the interatomic lattice spacing of the crystalline face of the deposited material when at said range of reaction temperatures.

16. A process according to claim 15 wherein said substrate major surface is selected to have an interatomic lattice spacing in the plane of said major surface less than about 0.2% different than the interatomic lattice spacing of the crystalline face of the deposited material when at said range of reaction temperatures.

17. A process according to claim 13 wherein said substrate is caused to have a substantially planar single crystalline destruction layer free surface by subjecting a surface of said single crystalline substrate material to the combined action of chemical-mechanical polishing.

References Cited

UNITED STATES PATENTS

| | | | |
|---|---|---|---|
| 2,994,621 | 8/1961 | Hugle et al. | 117—201 |
| 3,290,181 | 12/1966 | Sirth | 117—201 X |
| 3,359,143 | 12/1967 | Heywang et al. | 148—174 |
| 3,419,424 | 12/1968 | Steggewentz et al. | 117—201 |
| 3,420,705 | 1/1969 | Topas | 117—201 |
| 3,425,878 | 2/1969 | Dersin et al. | 117—201 X |
| 3,447,977 | 6/1969 | Sirth | 117—201 X |
| 3,472,685 | 10/1969 | Marfaing et al. | 117—201 |
| 3,493,444 | 2/1970 | Sirth et al. | 117—201 |

WILLIAM L. JARVIS, Primary Examiner

U.S. Cl. X.R.

117—106 A, 35 R; 356—106

UNITED STATES PATENT OFFICE
CERTIFICATE OF CORRECTION

Patent No. 3,692,572          Dated September 19, 1972

Inventor(s) Wolfgang H. Strehlow

It is certified that error appears in the above-identified patent and that said Letters Patent are hereby corrected as shown below:

Between lines 4 and 5 of Column 1, insert -- assignor to Minnesota Mining and Manufacturing Company, St. Paul, Minnesota, a Delaware Corporation, Application filed August 12, 1969, Serial No. 849,450 --.

Column 2, line 9, change (35 mm.$^2$) to -- (35 mm.)$^2$ --; and line 22, change "tha" to -- that --.

Column 3, line 28, change "111" to -- (111) --.

Column 5, line 16, change "0.051 mm." to -- 0.015 mm. --.

Column 6, line 41, change "thicknes sof" to -- thickness of --.

Claim 6, line 2, change "materials" to -- material --.

Claim 13, line 15, change "surfaces" to -- surface --.

Signed and sealed this 13th day of March 1973.

(SEAL)
Attest:

EDWARD M. FLETCHER, JR.
Attesting Officer

ROBERT GOTTSCHALK
Commissioner of Patents